(12) United States Patent
Bechteler et al.

(10) Patent No.: US 7,770,900 B2
(45) Date of Patent: Aug. 10, 2010

(54) CHUCK

(75) Inventors: Wolfgang Bechteler, Biessenhofen (DE); Josef Greif, Friesenried (DE)

(73) Assignee: Ott-Jakob GmbH & Co. Spanntechnik KG, Lengenwang (DE)

( * ) Notice: Subject to any disclaimer, the term of this patent is extended or adjusted under 35 U.S.C. 154(b) by 1076 days.

(21) Appl. No.: 11/427,794

(22) Filed: Jun. 30, 2006

(65) Prior Publication Data

US 2007/0001407 A1 Jan. 4, 2007

(30) Foreign Application Priority Data

Jul. 1, 2005 (DE) .................. 10 2005 030 820

(51) Int. Cl.
*B23Q 1/00* (2006.01)
*B23B 31/26* (2006.01)
*B23B 31/177* (2006.01)

(52) U.S. Cl. .................... 279/2.12; 279/2.09; 279/46.8; 403/374.2

(58) Field of Classification Search ............... 279/2.06, 279/2.09, 2.1, 2.11, 2.12, 43.8, 46.8, 139; 403/338, 373, 374.1, 374.2, 375; B23B 31/26, B23B 31/177; B23Q 1/00
See application file for complete search history.

(56) References Cited

U.S. PATENT DOCUMENTS

| | | | | |
|---|---|---|---|---|
| 4,844,671 A | * | 7/1989 | Reinauer | 409/233 |
| 4,978,262 A | * | 12/1990 | Tjernstrom | 409/233 |
| 4,997,325 A | * | 3/1991 | Heel et al. | 409/233 |
| 5,150,995 A | * | 9/1992 | Reinauer | 409/234 |
| 5,186,476 A | * | 2/1993 | Heel et al. | 279/2.03 |
| 5,346,344 A | * | 9/1994 | Kress et al. | 409/234 |
| 5,443,340 A | * | 8/1995 | Reinauer et al. | 409/233 |
| 5,722,806 A | * | 3/1998 | Erickson et al. | 409/233 |
| 5,851,093 A | * | 12/1998 | Erickson | 409/234 |
| 6,612,791 B1 | * | 9/2003 | Haimer | 409/232 |
| 6,923,605 B2 | * | 8/2005 | Jakob et al. | 409/233 |
| 6,972,105 B2 | * | 12/2005 | Boeckx et al. | 264/239 |

FOREIGN PATENT DOCUMENTS

| | | |
|---|---|---|
| DE | 2057900 | 5/1972 |
| DE | 197 03 354 C2 | 3/1998 |
| EP | 1 738 864 A2 | 1/2007 |

* cited by examiner

*Primary Examiner*—Eric A Gates
(74) *Attorney, Agent, or Firm*—Martin Fleit; Paul D. Bianco; Fleit Gibbons Gutman Bongini & Bianco PL

(57) ABSTRACT

The invention pertains to a chuck for detachable connection of two machine parts, with a chuck assembly arranged on or in a first machine part and a cooperating complementary part on or in a second machine part. The chuck assembly contains an axially displaceable tensioning element and several gripper elements associated with the tensioning element and radially movable by axial displacement of the latter, with a clamping surface for contact with a corresponding opposing surface of the complementary part. In order to allow a subsequent alignment or adjustment of the chucked machine part, the complementary part contains an outer part, an intermediate part arranged in the outer part, and an inner part arranged in the intermediate part, which are connected to one another by flexible outer and inner webs and are otherwise separated by outer and inner gaps. The intermediate and inner parts are adjustable in different directions relative to the outer part.

20 Claims, 5 Drawing Sheets

CHUCK

FIELD OF THE INVENTION

The invention pertains to a chuck for detachable connection of two machine parts, in particular, for chucking a machining module to a part of a machining apparatus.

BACKGROUND OF THE INVENTION

Such a chuck is known from DE 197 03 354 C1. Therein a tensioning element, movable axially in the direction of a central axis, with gripper elements that are movable radially by an axial displacement of the tensioning elements and contact its outer side, is provided in a first machine part for engagement in a clamp ring arranged on a second machine part. In this known chuck, the clamp ring is arranged to be movable transverse to the movement direction of the tensioning element inside an outer holding ring mounted on the second machine part. Due to this "floating" seating of the clamp ring that cooperates with the gripper elements, an alignment error, i.e., a lateral offset between the central axis of the tensioning element and the axis of the clamp ring, can be compensated. In the clamped state, however, the machine part to be chucked is pressed against the first machine part, so that a subsequent adjustment of the chucked second machine part is no longer possible.

DE 2 057 900 A discloses a lathe chuck flange which consists of three substantially concentric annular elements, and in which a radially movable centering ring, to which the chuck is nonpositively connected, is provided between a flange and the chuck. The centering ring can be adjusted by radially engaging centering screws and thus allows alignment and centering of the chuck.

The problem of the invention is to create a chuck of the type mentioned above that allows a subsequent alignment or adjustment of the chucked machine part.

SUMMARY OF THE INVENTION

This problem is solved by a device as set forth in the claims. Expedient configurations and advantageous refinements of the invention are the subject matter of the dependent claims.

With the chuck according to the invention, the machine part to be clamped can be adjusted and trued relatively easily because of the special design of the complementary part cooperating with the tensioning subassembly. By displacing the adjusting elements, preferably implemented as set screws, it is possible, for instance, for the outer part of the complementary part, which is rigidly connected to the machine part, to be adjusted in different directions relative to the inside part cooperating with the tensioning subassembly and to achieve a subsequent adjustment or truing of the machine part to be clamped. Since the outer part is displaced by way of an intermediate part and the connections between the outer part and the intermediate part, as well as those between the inside part and the intermediate part, are flexible in one direction and rigid in a direction perpendicular thereto, a relatively high overall rigidity of the chuck is achieved, despite the adjustment possibilities.

In a particularly expedient configuration, the outer part is connected to the intermediate part by way of diametrically opposing outer webs. The intermediate part is connected to the inner part by way of likewise diametrically opposing webs, with the outer webs offset relative to the inner webs by 90° in the circumferential direction. In that way, the outer part can be adjusted relative to the intermediate part in one direction, while it remains rigidly connected to the intermediate part in a direction perpendicular thereto. The intermediate part can be adjusted relative to the inner part in a direction perpendicular to the adjustment direction of the outer part, while it is rigidly connected to the inner part in the adjustment direction of the outer part. An easy possibility of adjustment in two mutually perpendicular axes is thereby achieved.

BRIEF DESCRIPTION OF THE DRAWINGS

Additional special aspects and advantages of the invention are evident from the description below of a preferred embodiment with reference to the drawings. Shown are.

DETAILED DESCRIPTION OF THE INVENTION

Figure 1:
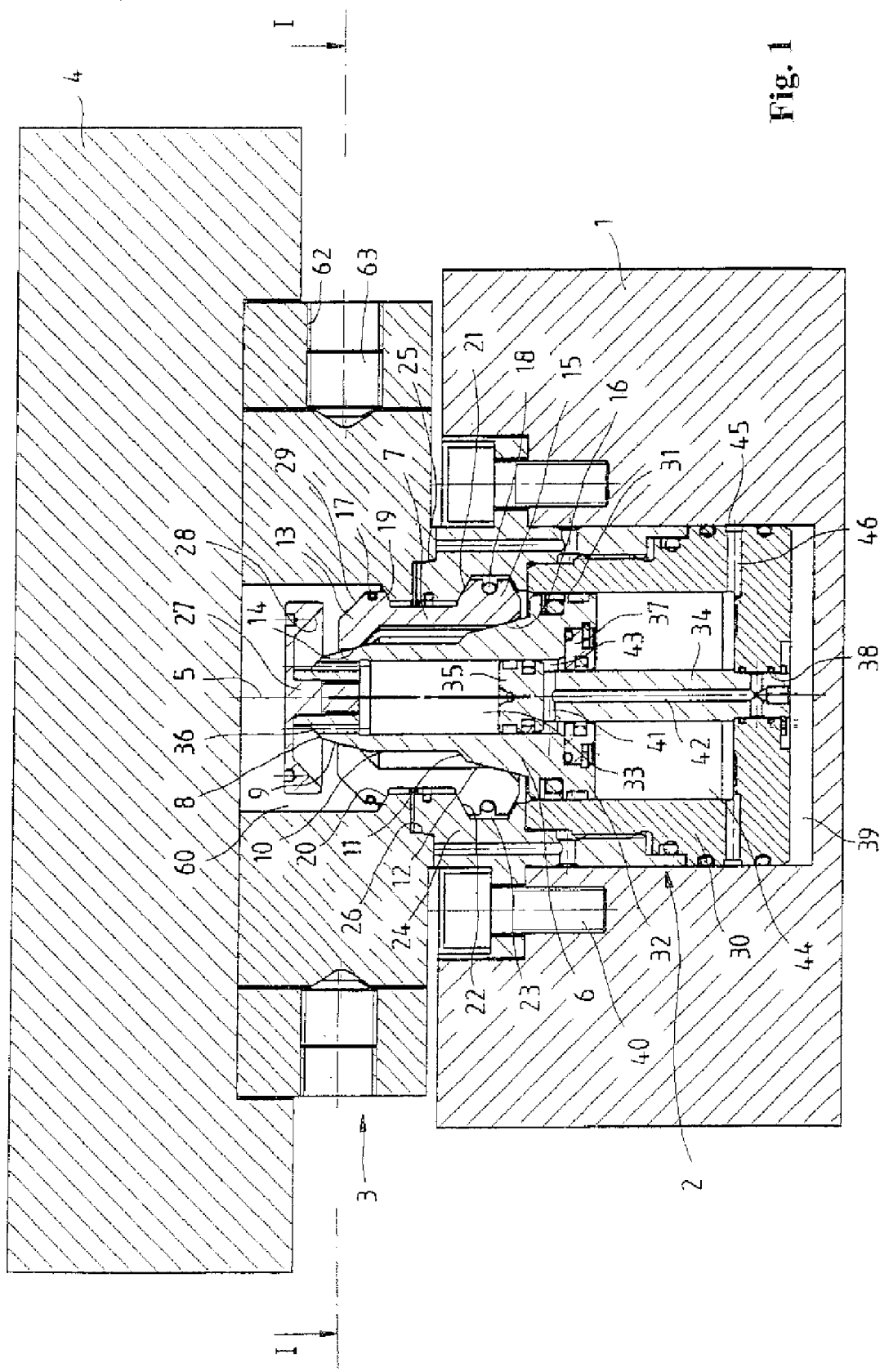
FIG. 1, a sectional view of a chuck according to the invention in a clamping position.
Figure 2:
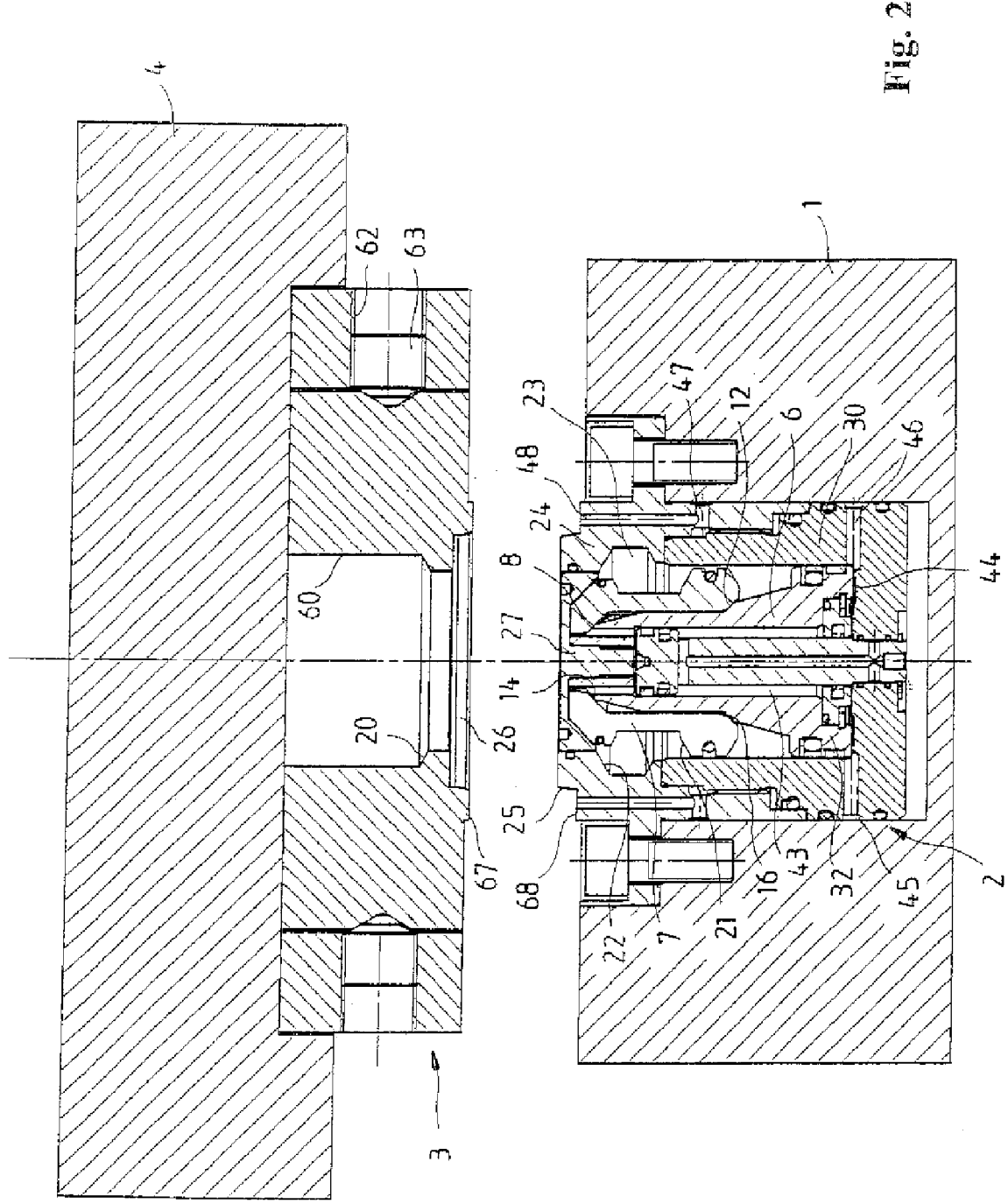
FIG. 2, a sectional view of the chuck of FIG. 1 in a releasing position.

The chuck shown in a clamping and a releasing position in FIGS. 1 and 2 contains a chuck assembly 2 arranged inside a first machine part 1, and a cooperating complementary part 3 that is arranged on or in a second machine part 4 that is to be chucked. First machine part 1 can be, for instance, a work table of a machining apparatus, a separate housing, or another suitable machine part. Second machine part 4 can be machining module, a clamping table or another machine part to be chucked.

Chuck assembly 2 contains a clamping element 6, arranged inside first machine element 1 so as to be axially movable in the direction of a center axis 5, and several gripper elements 7 that are arranged spaced apart in the circumferential direction on the outer side of clamping element 6 and can be moved radially and parallel to center axis 5 by axial displacement of clamping element 6. For this purpose, clamping element 6 comprises a narrower area with a first conical contact surface 8 and a second conical contact surface 9 at its free end at the top end in FIG. 1, an adjoining cylindrical area 10 and a subsequent broadened area with a third conical contact surface 11 and fourth conical contact surface 12.

Gripper elements 7 have an upper end 13 engaging in complementary part 3 with a first inside face 14 for contact on conical contact surfaces 8 or 9 of clamping element 6, and an opposite lower end 15 with a second inside face 16 for contact on conical contact surfaces 11 or 12 of clamping element 6.

Gripper elements 7 are pressed inwards onto clamping element 6 by two surrounding annular springs 17 and 18. On the outer side of the upper ends 13 of gripper elements 7 that engage with complementary part 3 is provided a first clamping surface 19 which rests in the position shown in FIG. 1 against a conical opposing surface 20 in the interior of complementary part 3. In the position shown in FIG. 1, a second clamping surface 21, which comes into contact with a conical opposing surface 22 of an annular groove 23 on the inner side of an inset bushing 24, is provided at the lower ends 15 of gripper elements 7. The two clamping surfaces 19 and 21 on the outside of gripper elements 7, as well as the corresponding opposing surfaces 20 and 22, are inclined oppositely to one another in relation to central axis 5. At its upper end inset bushing 24 comprises an inset centering shoulder 25 for engagement with a corresponding centering opening 26 on the underside of complementary part 3.

A driving disk 27, which cooperates with the upper ends 13 of gripper elements 7 when tensioning element 6 is advanced, is mounted on the upper end of tensioning element 6. For this purpose, driving disk 27 contains an inside conical surface 28, which engages with conical outer surface sections 29 at the upper ends 13 of gripper elements 7 when tensioning element 6 is advanced.

In the embodiment shown here, tensioning element 6 is constructed in the manner of a pressure plunger, which has at its lower end in FIG. 1 a pressure piston 32 movably guided inside a cylinder 30 and sealed by a gasket 31 against cylinder 30. In a bore 33 inside tensioning element 6, there is additionally an inner piston 35, radially sealed, that is supported by way of a piston rod 34 at the bottom of cylinder 30. In the upper end of tensioning element 6, ventilation openings 36 are provided communicating with bore 33. Piston rod 34 penetrates, radially sealed, though a guide ring 37 arranged at the inside end of tensioning element 6, and is seated at its end remote from inner piston 35 in a corresponding hole 38 in the bottom of cylinder 30. Cylinder 30 is screwed to inset bushing 24, and is inserted together with it into an opening 39 of first machine part 1. Inset bushing 24, provided with an annular flange, is fixed together with cylinder 30 in opening 39 by means of several screws 40.

A first pressure space 43, which can be charged with a pressure fluid, preferably hydraulic fluid, via radial openings 41 and a central supply channel 42 running through piston rod 34, is bounded between guide ring 37 and the inner annular surface of inner piston 35 that faces guide ring 37. A second pressure space 44, which can be charged with pressure fluid via an annular channel 45 and radial openings 46, is bounded between the inner end surface of pressure piston 32 and the bottom of cylinder 30. As is evident particularly from FIG. 2, an annular channel 47 with several blowing-air bores 48 at the top is provided in inset bushing 24. Compressed air for cleaning the contact surfaces on inset bushing 24 and complementary part 3 can be supplied via annular channel 47 and air-blast bores 48.

Figure 3:
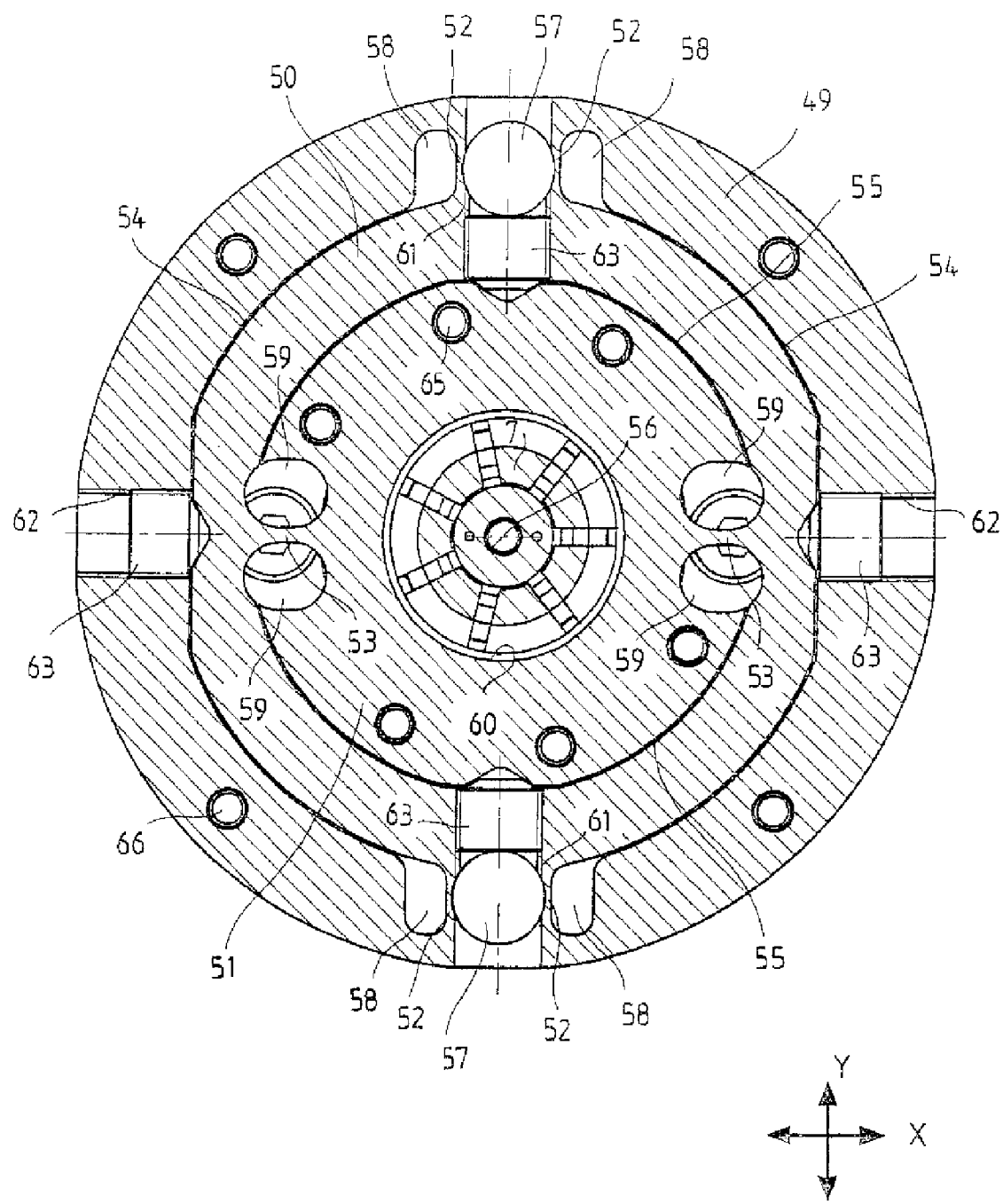
FIG. 3, a complementary part of the chuck shown in FIGS. 1 and 2 in a cross section along line I-I of FIG. 1.
Figure 4:
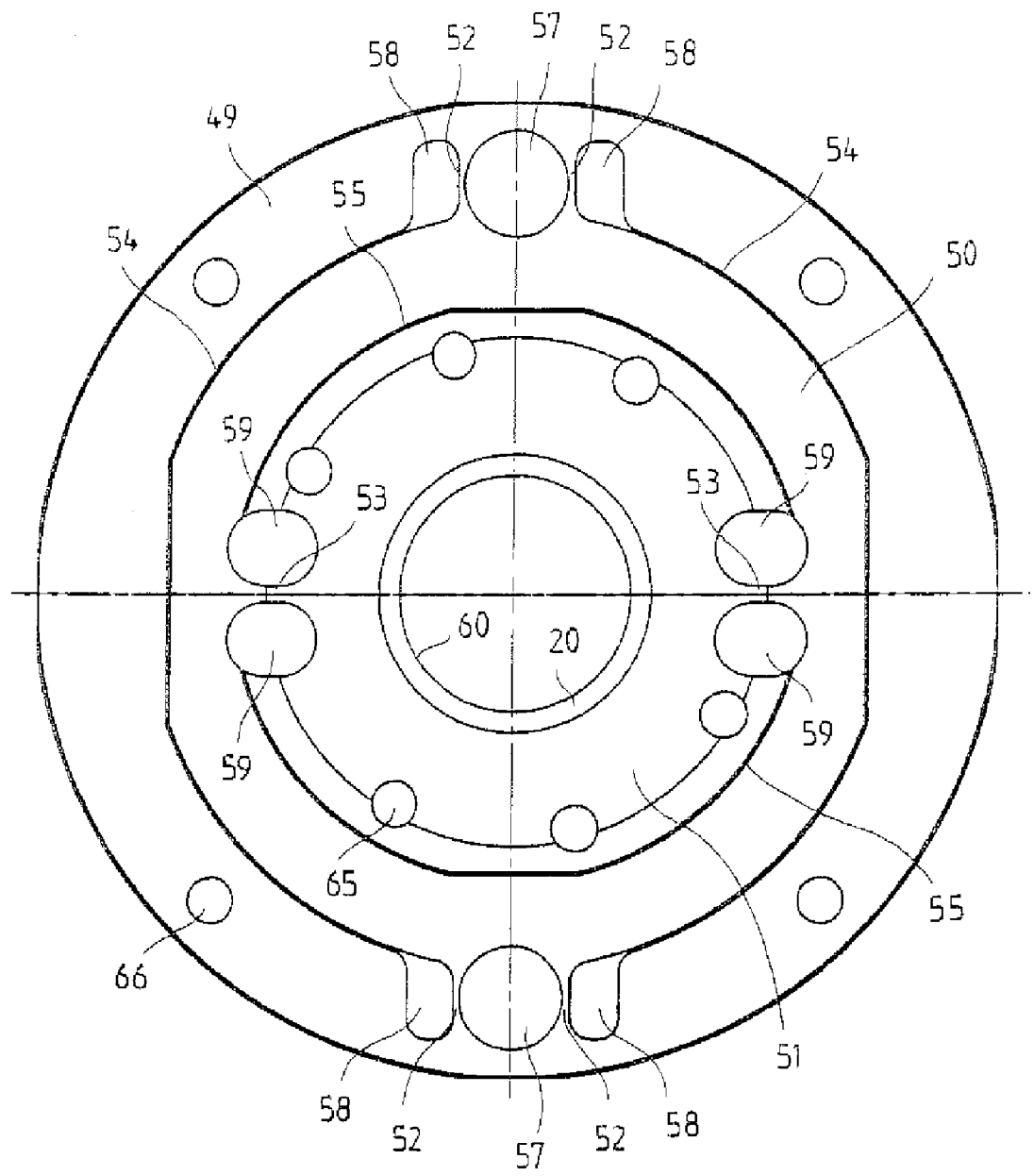
FIG. 4, the complementary part of FIG. 3 in a plan view.

Complementary part 3 cooperating with chuck assembly 2 is shown in FIGS. 3 and 4. As is evident particularly from the cross section in FIG. 3, complementary part 3, manufactured from a single piece, contains an outer part 49, which is substantially annular in the embodiment shown, an intermediate part 50 arranged inside outer part 49, and an inner part 51 arranged in intermediate part 50; these are connected only by way of thin flexible outer and inner webs 52 and 53, respectively, and are otherwise separated from one another by narrow semi-annular inner and outer gaps 54 and 55. In the embodiment shown, substantially annular outer part 49 is connected to likewise annular intermediate part 50 way of two parallel outer webs 52 at each of two diametrically opposite sides. Outer webs 52 are arranged between two diametrically opposite passage openings 57 running parallel to central axis 56 of outer part 49 and two lateral recesses 58 next to the openings. Recesses 58 are each arranged at the end of the substantially semicircular outer gaps 54.

Inside part 51 is likewise annular in form and is connected to intermediate part 50 by way of two inner webs 53 provided at diametrically opposite sides. The two inner webs 53 are offset in the circumferential direction of complementary part 3 by 90° relative to outer webs 52, and are situated on each opposing side between two spaced-apart oval recesses 59 provided on the outer side of inside part 51 at the ends of the two semi-annular inner gaps 54. Both openings 58 and 59 as well as inner and outer semicircular gaps 54 and 55 can be manufactured particularly expediently by wire electrical discharge machining. Gripper elements 7 of chuck assembly 2 engage in a central passage opening 60 of inside part 51.

Diametrically opposed radial threaded holes 61 and 62 offset by 90° from one another are provided in complementary part 3, with two diametrically opposed holes 61 running transversely through passage openings 57 up to inside part 51, and the two other holes 62 running up to intermediate part 50. Adjusting elements 63 embodied as set screws are arranged in threaded holes 61 and 62. The inner ends of adjusting elements 63 catch hold of recesses 64 in the outer sides of the inside part and the intermediate part, respectively. Several through-holes 65 and 66 run in the direction of central axis 56 in outer part 49 and inner part 51; these are provided for retaining screws for a tight connection of outer part 49 and inner part 51 to machine part 4.

The functioning of the chuck described above will be explained below on the basis of FIGS. 1-3.

In the detached or exchange position shown in FIG. 2, tensioning element 6 is in a completely retracted position, wherein the upper side of driving disk 27 screwed into tensioning element 6 is completely sealed and flush with the upper side of conical centering shoulder 25. Gripper elements 7 are arranged at their radially innermost position and rest at their inside surfaces 14 and 16 against conical contact surfaces 8 and 12 of the tensioning element. In the detached or exchange position shown, second machine part 4 that is to be chucked, along with complementary part 3, can be placed on inset bushing 24 mounted in first machine part 1 such that centering shoulder 25 of inset bushing 24 mounted in machine part 1 engages with centering opening 26 on the underside of complementary part 3 and a downward-projecting annular shoulder 67 of complementary part 3 comes to rest on an annular contact surface 68 of inset busing 24.

In order to chuck machine part 4, a pressure fluid is supplied into pressure space 44 via annular channel 45 and radial openings 46. Pressure piston 32 is thereby subjected to pressure from below and thus tensioning element 6 is advanced out of inset bushing 24. At first gripper elements 7 are held by the two annular springs 17 and 18 in the inner radial position shown in FIG. 2 and are pushed upwards together with tensioning element 6, until second tensioning surfaces 21 of gripper elements 7 come to rest on the associated opposing surface 22 inside annular groove 23 of inset bushing 24. Further outward movement of gripper element 7 is thereby stopped. During the further outward movement of tensioning element 6, gripper elements 7 are first pushed relatively quickly outwards by conical contact surfaces 8 and 11 of tensioning element 6, and then are pushed outwards at high pressure by conical contact surfaces 9 and 12. As a result of the contact of tensioning surface 21 with opposing surface 22 and their inclination, gripper elements 7 are drawn back into inset bushing 24 until first clamping surfaces 19 of gripper elements 7 reset against opposing surface 20 of complementary part 3, and complementary part 3 is drawn against the inset bushing.

To detach machine part 4, the pressure fluid is drained from the pressure space and instead, pressure space 43 is charged with pressure fluid. Inner piston 35 is thereby acted upon, and tensioning element 6 is retracted. During retraction of tensioning element 6, gripper elements 7 are moved downwards by driving disk 27. In this process, driving disk 27 comes to rest at its inner conical surface 28 on conical surface sections 29 of gripper elements 7, whereby the latter are detached from their clamping position and moved radially inwards. The radially inward motion is assisted by annular springs 17 and 18. As soon as gripper elements 7 come to rest on the cylindrical area 10 of tensioning element 6, they are drawn into inset bushing 24 and again assume the detachment or exchange position shown in FIG. 2.

With the above-described chuck, a repositioning or adjustment of the machine part 4 to be chucked is also possible in the clamped position, if desired. For this purpose, the retaining screws arranged in the through-holes 65 of inside part 51 are loosened, so that machine part 4 can be displaced laterally relative to inside part 51, within the limits of the gap. By adjusting setscrews 63 in threaded holes 61, intermediate part 50 can be displaced, due to flexible webs 53, relative to inner part 51 in one direction (Y direction in FIG. 3) within the limits of the play determined by gap 55, while it is rigidly connected to the inner ring in a direction perpendicular thereto (X direction in FIG. 3). By adjusting setscrews 63 arranged in threaded holes 62 on the other hand, outer part 49 can be displaced, due to flexible webs 52, relative to intermediate part 50 in a direction perpendicular to the adjustment direction of intermediate part 50 (X direction in FIG. 3) within the limits determined by the play of gap 54, while it remains rigidly connected to intermediate part 50 in the perpendicular direction (Y direction in FIG. 3). In this way, machine part 4 can be subsequently adjusted in two axial directions (X and Y axis), and when machine part 4 has been aligned, the retaining screws in through-holes 65 can be tightened so that the desired position of machine part 1 is maintained. An additional height adjustment can be achieved by arranging inset bushing 24 height-adjustably in first machine part 1.

The invention is not limited to the above-described embodiment. Thus, the tensioning element can be moved by an electrical, pneumatic or other suitable drive means, rather than by a hydraulic drive.

Figure 5:
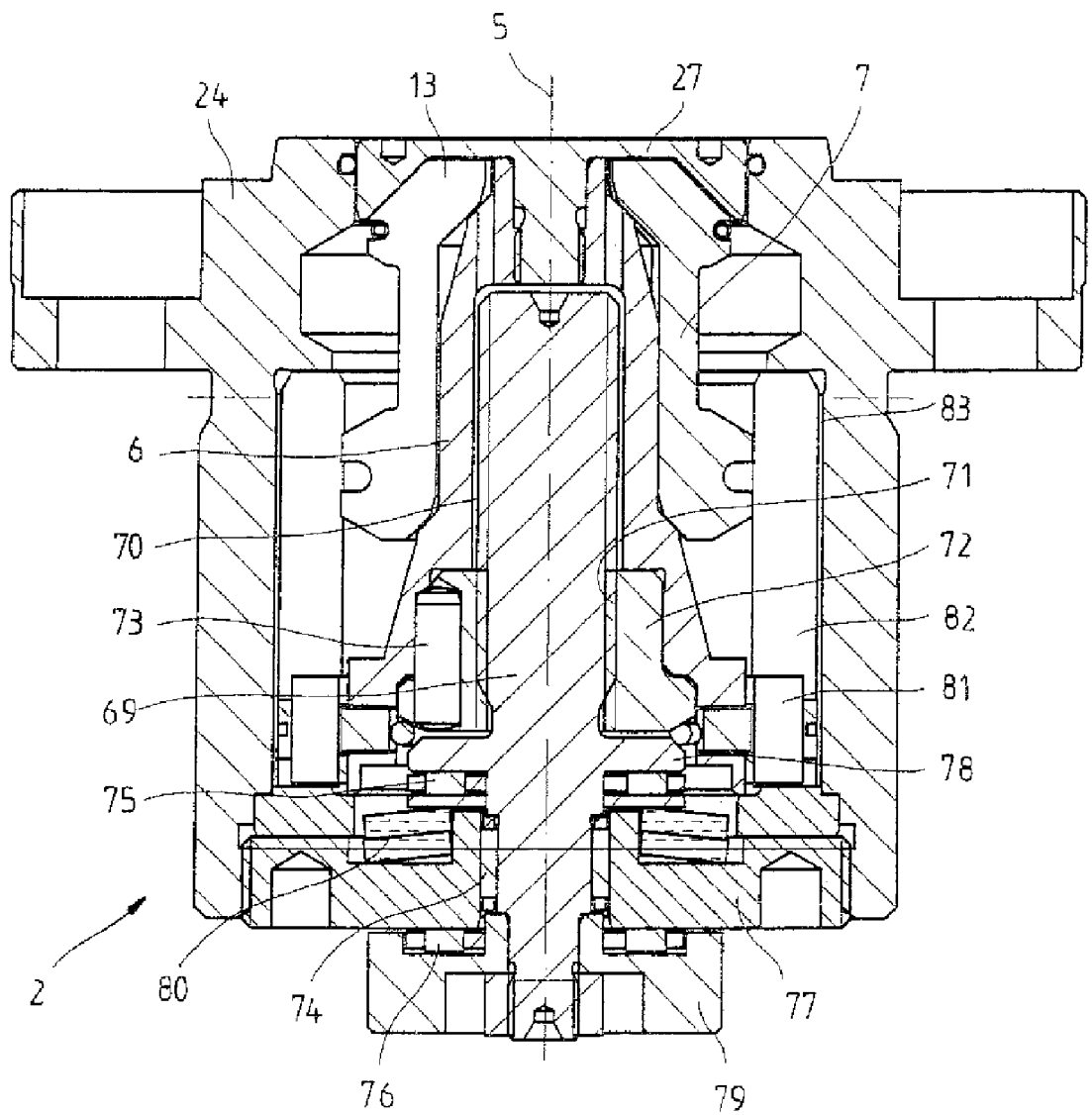
FIG. 5, a second embodiment of a chuck in sectional view.

An additional example of a chuck assembly for manual or electrical actuation is shown in FIG. 5. Components corresponding to the previously described embodiment are furnished with the same reference numbers. In this example as well, chuck assembly 2 arranged inside a first machine part comprises an axially displaceable tensioning element 6 inside an inset bushing 24, and several gripper elements 7 that are arranged spaced apart circumferentially on the outer side of tensioning element 6, and are movable parallel and radially with respect to central axis 5 by displacement of tensioning element 6. A driving disk 27 that cooperates with upper ends 13 of the gripper elements as in the first embodiment during retraction of tensioning element 6 is likewise placed at the upper end of tensioning element 6. Chuck assembly 2 is tightly closed off by driving disk in the retracted position.

Tension element 6 is axially displaced here by a threaded spindle 69 that engages by way of an upper threaded spindle 70 with a matching inside thread 71 of a spindle nut 72 connected to tensioning element 6. Spindle nut 72 is arranged axially secured and rotatable in tensioning element 6 by way of a radial bearing 73. Threaded spindle 69 is rotatably seated by way of a radial bearing 74 and upper and lower axial bearings 75 and 76, respectively, on a bearing cover 77 screwed into inset bushing 24, and is axially secured by an annular collar 78 as well as a disk 79 screwed onto the lower end of threaded spindle 69. Disk 79 is connected to threaded spindle 69 by way of a positive shaft-hub connection. Threaded spindle 69 is under initial tension from spring washers 80. In order to secure tensioning element 6 against torsion, pins 81 are mounted on it and engage with corresponding longitudinal grooves 82 of a sleeve 83 screwed into inset bushing 24.

By turning threaded spindle 69, tensioning element 6 can be displaced by way of spindle nut 72, and the chuck can be operated. The threaded spindle can be turned either manually or by means of a motor.

What is claimed is:

1. A detachable connection of two machine parts (1, 4), comprising a chuck assembly (2) arranged on or in a first machine part (1) and a cooperating complementary part (3) on or in a second machine part (4), wherein said chuck assembly (2) contains an axially displaceable tensioning element (6) and several gripper elements (7) associated with said tensioning element (6) and radially movable by axial displacement of the latter, with a clamping surface (19) for contact with a corresponding opposing surface (20) of said complementary part (3), wherein said complementary part (3) contains an outer part (49), an intermediate part (50) arranged in said outer part (49), and an inner part (51) arranged in said intermediate part (50), which are connected to one another by flexible outer and inner webs (52, 53) and otherwise are separated by outer and inner gaps (54, 55), and wherein said intermediate part (50) and said inner part (51) associated with said gripper elements (7) are adjustable by means of adjusting elements (63) in different directions relative to said outer part (49).

2. The detachable connection according to claim 1, wherein the outer part (49) is connected to the intermediate part (50) by two parallel outer webs (52) on respective diametrically opposing sides.

3. The detachable connection according to claim 2, wherein the two parallel outer webs (52) are arranged between diametrically opposed passage openings (57) of the outer part (49), which run parallel to a central axis (56) of the outer part (49), and two recesses (58) arranged alongside them.

4. The detachable connection according to claim 3, wherein the recesses (58) are arranged at an end of the two semicircular outer gaps (54).

5. The detachable connection according to claim 1, wherein the inner part (51) is connected to the intermediate part (50) by two inner webs (53) provided on diametrically opposing sides.

6. The detachable connection according to claim 5, wherein two oval recesses (59), spaced apart from one another on opposing sides of the inner inside part (51), are associated with inner webs (53).

7. The detachable connection according to claim 6, wherein oval recesses (59) are arranged at an end of semicircular inner gaps (54).

8. The detachable connection according to claim 1, wherein the outer and inner webs (52, 53) are offset relative to one another by 90° in the circumferential direction of the complementary part (3).

9. The detachable connection according to claim 1, wherein the tensioning element (6) includes a pressure plunger with a pressure piston (32) movably guided inside a cylinder (30).

10. The detachable connection according to claim 9, wherein an inner piston (35) is arranged so as to be axially movable in a bore (33) in an interior of the tensioning element (6) by means of a piston rod (34) supported on the bottom of the cylinder (30).

11. The detachable connection according to claim 10, wherein the piston rod (34) penetrates, radially sealed, though a guide ring (37) arranged at an inside end of the tensioning element (6), and is seated at its end remote from the inner piston (35) in a corresponding hole (38) on the bottom of the cylinder (30).

12. The detachable connection according to claim 11, wherein a first pressure space (43), which can be charged with a pressure fluid via radial openings (41) and a supply channel (42) that runs through the piston rod (34), is bounded between the guide ring (37) and an inner annular surface of the inner piston (35) that faces the guide ring (37).

13. The detachable connection according to claim 9, wherein a second pressure space (44), which can be charged with pressure fluid via an annular channel (45) and radial openings (46), is bounded between an inner end surface of the pressure piston (32) and the bottom of the cylinder (30).

14. The detachable connection according to claim 9, wherein the cylinder (30) is screwed to an inset bushing (24), and is inserted together with it into an opening (39) in the first machine part (1).

15. The detachable connection according to claim 14, wherein an annular channel (47) with several blowing-air bores (48) at the top is provided in the inset bushing (14).

16. The detachable connection according to claim 1, wherein the tensioning element (6) can be displaced by a threaded spindle (69) and a spindle nut (72) connected to the tensioning element (6).

17. The detachable connection according to claim 16, wherein the spindle nut (72) is arranged axially secured and rotatable in the tensioning element (6) by way of a radial bearing (73).

18. The detachable connection according to claim 16, wherein the threaded spindle (69) is rotatably seated by way of a radial bearing (74) and upper and lower axial bearings (75, 76), respectively, on a bearing cover (77), and is axially secured by an annular collar (78) as well as a disk (79) screwed onto a lower end of threaded spindle (69).

19. The detachable connection according to claim 16, wherein the threaded spindle (69) is under initial axial tension from spring washers (80).

20. The detachable connection according to claim 16, wherein the tensioning element (6) is secured against torsion by radially projecting pins (81) that engage with corresponding longitudinal grooves (82) of a sleeve (83).

\* \* \* \* \*